(12) United States Patent
Rao D V

(10) Patent No.: US 10,554,594 B2
(45) Date of Patent: Feb. 4, 2020

(54) METHOD AND SYSTEM FOR AUTOMATIC SWITCHING BETWEEN CHAT WINDOWS

(71) Applicant: VMware, Inc., Palo Alto, CA (US)

(72) Inventor: Raja Rao D V, San Mateo, CA (US)

(73) Assignee: VMware, Inc., Palo Alto, CA (US)

( * ) Notice: Subject to any disclaimer, the term of this patent is extended or adjusted under 35 U.S.C. 154(b) by 383 days.

(21) Appl. No.: 13/738,785

(22) Filed: Jan. 10, 2013

(65) Prior Publication Data
US 2014/0195933 A1    Jul. 10, 2014

(51) Int. Cl.
*H04L 12/58* (2006.01)
*G06F 3/0481* (2013.01)

(52) U.S. Cl.
CPC .......... *H04L 51/046* (2013.01); *G06F 3/0481* (2013.01)

(58) Field of Classification Search
CPC ..... H04L 51/046; H04L 12/581; H04L 51/04; G06F 3/0481
USPC ................ 455/412.2; 709/206, 207; 715/758
See application file for complete search history.

(56) References Cited

U.S. PATENT DOCUMENTS

| | | | | |
|---|---|---|---|---|
| 6,018,341 A * | 1/2000 | Berry | ..................... | G06F 3/0481 715/794 |
| 6,300,951 B1 * | 10/2001 | Filetto | ................... | G06F 3/0481 715/716 |
| 7,250,955 B1 * | 7/2007 | Beeman | ................... | G06F 9/542 345/592 |
| 7,356,775 B2 * | 4/2008 | Ruelle | ................... | G06F 3/0481 715/802 |
| 7,895,273 B1 * | 2/2011 | Haldar | .................... | G06Q 10/10 370/229 |
| 2004/0230659 A1 * | 11/2004 | Chase | ................... | H04L 12/581 709/206 |
| 2005/0055416 A1 * | 3/2005 | Heikes | ..................... | H04L 51/04 709/207 |
| 2005/0198589 A1 * | 9/2005 | Heikes | .................. | G06F 9/4443 715/805 |
| 2006/0117263 A1 * | 6/2006 | Locke | ................... | G06Q 10/107 715/751 |
| 2007/0022172 A1 * | 1/2007 | Anglin | .................... | G06Q 10/10 709/207 |
| 2007/0198646 A1 * | 8/2007 | Chen | ................... | H04L 12/1822 709/207 |
| 2008/0028027 A1 * | 1/2008 | Jachner | ................. | H04L 12/581 709/206 |
| 2009/0113014 A1 * | 4/2009 | Goldberg | ............. | G06Q 10/107 709/207 |
| 2009/0192970 A1 * | 7/2009 | O'Sullivan | ........... | G06F 17/211 706/48 |
| 2010/0174999 A1 * | 7/2010 | Fioretti | .................. | G06Q 10/10 715/753 |

(Continued)

*Primary Examiner* — Amy M Levy
(74) *Attorney, Agent, or Firm* — Fish & Richardson P.C.

(57) ABSTRACT

The disclosure herein describes a chat system for intelligent automatic switching between multiple chat windows. During operation, the system monitors activities occurring within the multiple chat windows and determines whether a window-switching operation is needed based on the monitored activities. In response to determining that the window-switching operation is needed, the system automatically performs the window-switching operation without the need for a user of the chat application to perform the window-switching operation manually.

25 Claims, 6 Drawing Sheets

(56) References Cited

U.S. PATENT DOCUMENTS

2010/0217808 A1* 8/2010 Benninger .............. H04L 51/04
709/206
2010/0318620 A1* 12/2010 Bansal ................... H04L 51/04
709/206

* cited by examiner

METHOD AND SYSTEM FOR AUTOMATIC SWITCHING BETWEEN CHAT WINDOWS

BACKGROUND

Online chat enables real-time communications, usually in the form of text or multimedia-based messages, between two or more parties. Many tools, such as instant messengers, Internet Relay Chat (IRC), talkers, etc., are available for users to perform one-to-one chat or one-to-many group chat. Unlike other one-way communication channels, such as emails or SMS (Short Message Service) messages, where the delay for visual access to the sent message often hampers the flow of communications, users of the various online chat systems can view the status (such as busy or away) of other users, and receive instant responses from the other users. The direct, bi- or multi-direction, and real-time nature of online chat applications make them preferred ways of communication among many people. Recently, an increasing number of corporate users are adopting online chatting as a preferred communication channel for business uses such as providing customer support. Nonetheless, most chat applications still remain only as a simple communication tool and do not take full advantage of the computing power available today.

SUMMARY

The disclosure herein describes a chat system for intelligent, automatic switching between multiple chat windows. During operation, the system monitors activities occurring within multiple chat windows and determines whether a window-switching operation is needed based on the monitored activities. In response to determining that the window-switching operation is needed, the system automatically performs the window-switching operation without the need for a user of the chat application to perform the window-switching operation manually. The monitored activities may include activities include a message being received, a message being typed, and a message being sent.

BRIEF DESCRIPTION OF FIGURES

In the figures, like reference numerals refer to the same figure elements.

DETAILED DESCRIPTION

Figure 1:
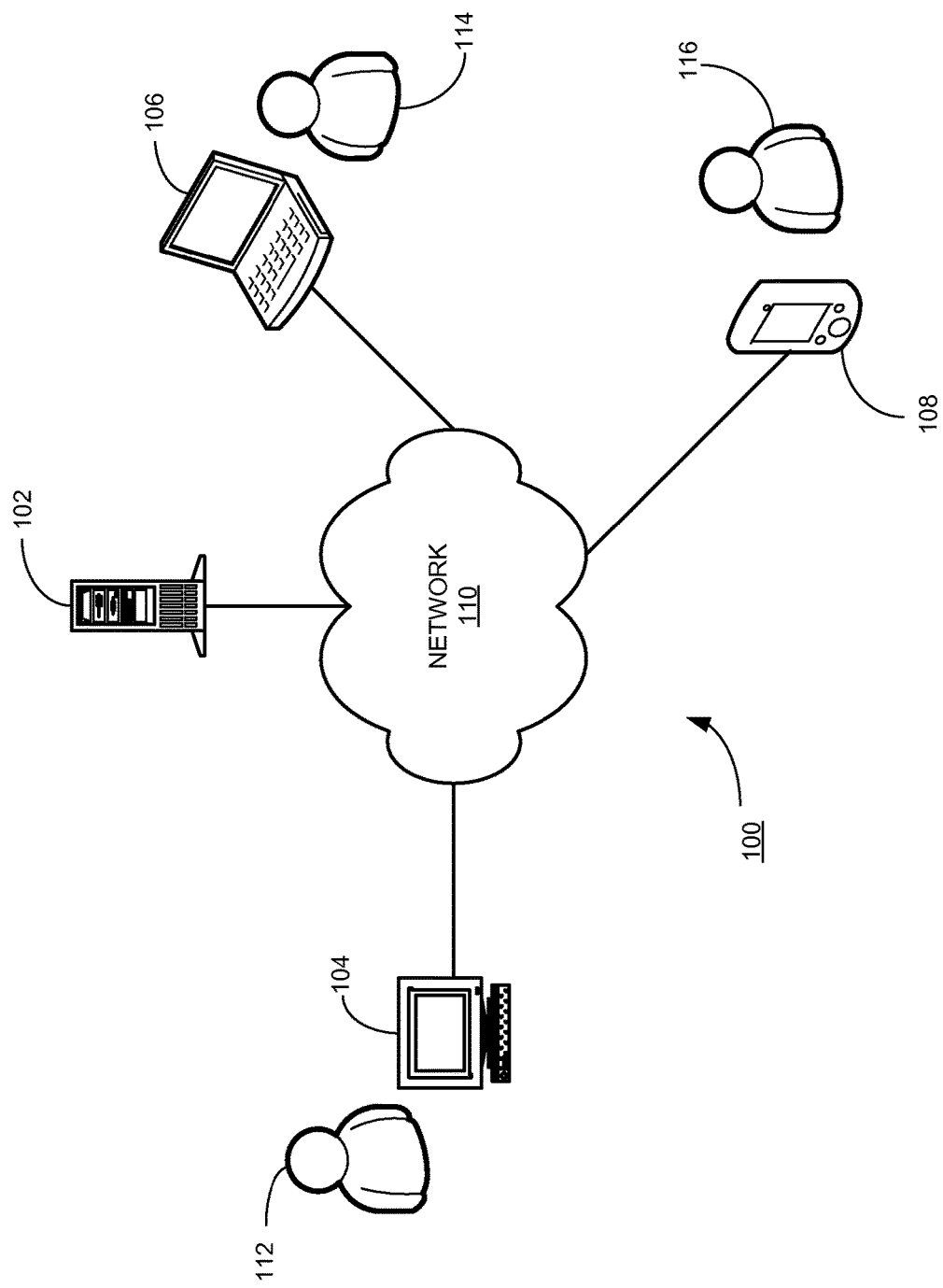
FIG. 1 presents a diagram illustrating an exemplary chat system.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

This present disclosure describes an intelligent chat-window-switching system that enhances a user's experience in participating in online chat. More specifically, when a user is chatting with multiple other users, or has opened multiple chat windows, the intelligent chat-window-switching system automatically switches between these chat windows based on user activities and content presented within the chat windows.

Instant-messaging (IM) applications (or instant messengers) have enabled real-time direct communications among users over the Internet or other types of networks. IMs are advantageous over emails due to their quasi-synchronous nature that allows immediate acknowledgment or reply. IMs are also advantageous over phones because they provide more flexibility and many IM services are free to users. Moreover, additional features, such as video- or audio-based chat and file transfers, make IMs even more popular. However, there are still drawbacks in currently available IM tools. For example, nowadays, most IM tools require a user to manually switch between IM windows when the user is actively talking with multiple users at the same time. If the IM windows are tiled (either vertically or horizontally), in order to type into a window of interest, the user still needs to click on the window of interest to make it the currently focused window. If the IM windows are minimized, the user needs to select the window of interest from a list of windows, and restore it in order to chat with the participant of that window. If the IM windows are stacked on top of one other, the user still needs to click on a particular tab to select the desire window. Such manual processes are cumbersome and error prone, especially when the number of open chat windows is relatively large. Many users have had the frustrating experience of typing into a wrong window, which may cause a message to be sent to the wrong participant. Such experiences can be socially embarrassing, or in a customer service setting, may cause private information associated with one customer to be accidentally revealed to a different customer.

To overcome these problems, the system described herein enables intelligent, automatic switching of chat windows. More specifically, when multiple chat windows are open, the system monitors activities within each chat window, and automatically switches between the windows for the user based on the monitored activity. Hence, the user no longer needs to switch between chat windows manually, which results in a more enjoyable and less error-prone chat experience.

FIG. 1 presents a diagram illustrating an exemplary chat system. In FIG. 1, an intelligent chat system 100 includes a chat server 102, a number of chat clients 104, 106, and 108, and a network 110.

Network 110 may correspond to any type of wired or wireless networks capable of coupling computing nodes (e.g., chat server 102 and chat clients 104-108). Such networks include, but are not limited to, a local area network (LAN), a wide area network (WAN), an enterprise's intranet, a virtual private network (VPN), and/or a combination of such networks. In one embodiment of the present system, network 110 includes the Internet. Network 110 may also include telephone and cellular networks, such as Global Systems for Mobile Communications (GSM) networks or Long Term Evolution (LTE) networks.

Chat server 102 provides online chat services to multiple client machines. In one embodiment, chat server 102 runs a chat server application that provides instant messaging (IM) services, which can be an Enterprise Instant Messaging (EIM) service or a Consumer Instant Messaging (CIM) service. Various types of messaging protocols can be used by chat server 102, including, but not limited to: Instant Messaging and Presence Protocol (IMPP), Extensible Messaging Presence Protocol (XMPP), Advanced Message Queuing Protocol (AMQP), and various other proprietary protocols.

Users, such as users 112, 114, and 116, can communicate or instantly chat with each other via chat client applications that run on the chat clients, such as chat clients 104, 106, and 108, respectively. The chat clients can be any type of node on network 110 with computational capability and mechanisms for communicating across the network. The chat clients can include, but are not limited to: a workstation, a personal computer (PC), a laptop computer, a tablet computer, a smartphone, and/or other electronic computing devices with network connectivity. Furthermore, the chat clients may couple to network 110 using wired and/or wireless connections.

The intelligent chat-window-switching module may be part of the chat client application or the chat server application. In one embodiment, the intelligent chat-window-switching module is part of the chat client application, residing on a chat client machine.

Figure 2:
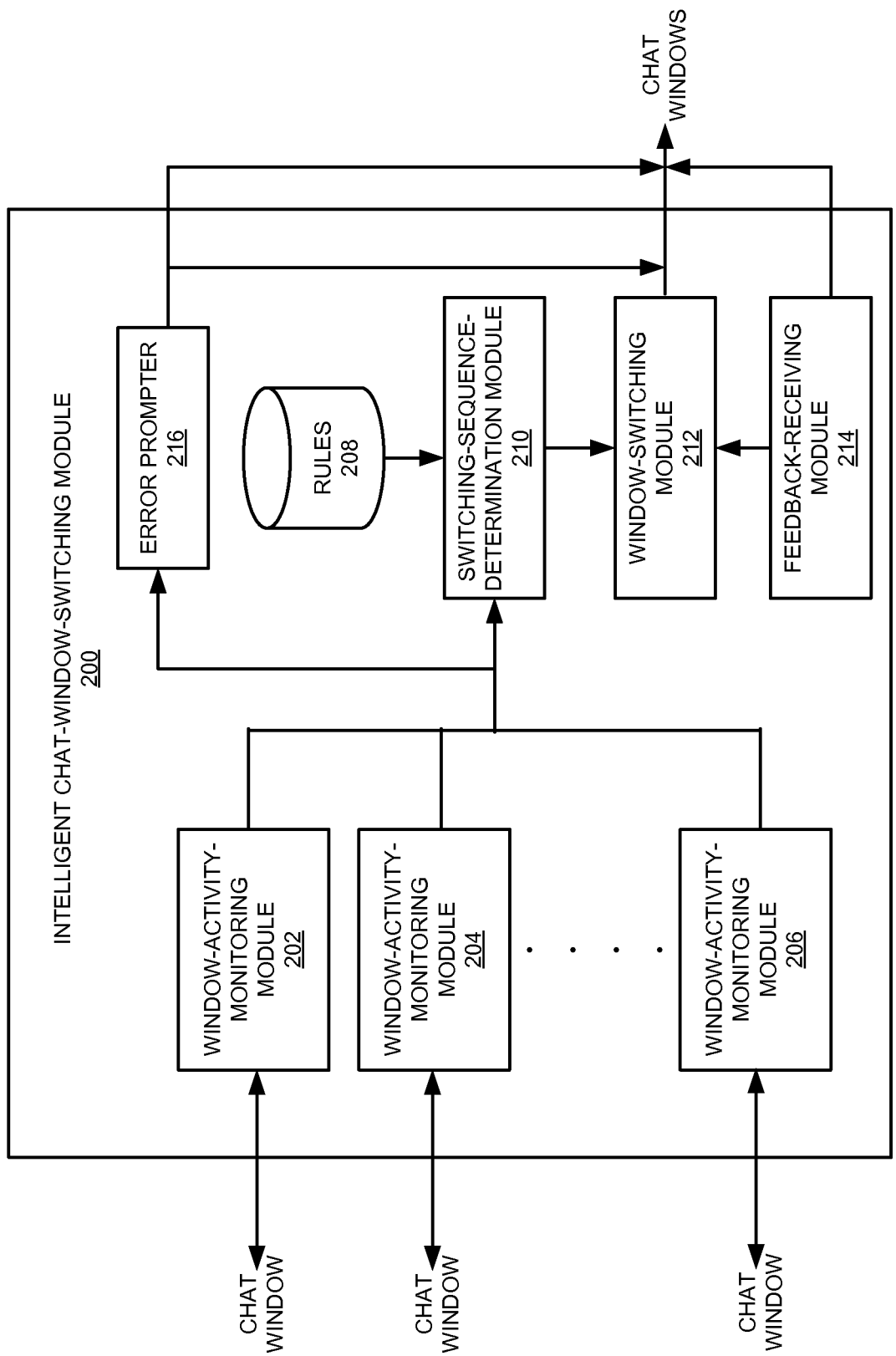
FIG. 2 presents a diagram illustrating an exemplary architecture of an intelligent chat-window-switching module.

FIG. 2 presents a diagram illustrating an exemplary architecture of an intelligent chat-window-switching module. In FIG. 2, intelligent chat-window-switching module 200 includes a number of window-activity-monitoring modules, such as modules 202, 204, and 206, a rule database 208, a switching-sequence-determination module 210, a window-switching module 212, a feedback-receiving module 214, and an error prompter 216.

Window-activity-monitoring modules 202, 204, and 206 are responsible for monitoring activity within each individual chat window, with one window-activity-monitoring module designated for one chat window. The monitored activities can include, but are not limited to: receiving a message, sending a message, and typing a message. Window-activity-monitoring modules, such as module 202, can track the times at which these activities occur. In addition, window-activity-monitoring module 202 may also monitor the chat content. For text-based chat, a language parser can be implemented to parse the natural language typed by chat participants within the chat window, and to infer meanings of the conversation. In one embodiment, the language parser can adapt to and learn the writing habits of the users, such as frequently used words or acronyms, over time. For audio- or video-based chat, an optional speech-recognition module can convert the spoken words into text, and then the language parser can parse the natural language. Similarly, the speech-recognition module can adapt to and learn the user's speaking habits over time. In addition to monitoring the current ongoing conversation, a respective window-activity-monitoring module may also access locally or remotely cached historical data, such as previously saved conversations or previously established user behavior models, and infer meanings of the conversation using such historical data. Note that historical data is particularly useful in inferring the meanings of phrases that may have multiple meanings.

Rule database 208 stores a set of heuristic rules that govern the way the system automatically switches between open chat windows. Some of the rules are user-definable and some of the rules are adaptively learned by the system. An example of a user-defined rule may be "allowed to leave a window if the window has remained idle for a predetermined amount of time." In other words, the system is allowed to leave a chat window if no message is received and if the user is not actively typing in the window. Note that leaving a chat window means that the window is minimized or the window, although remaining on the desktop or in view in the webpage for web-based IMs, is no longer being focused on; hence, any subsequent typing activity no longer impacts the switched-from window. The user can specify the amount of wait time before allowing the system to leave an idle window or the system can use a default value, such as five minutes.

Another example of a user-defined rule may allow the system to activate chat windows sequentially based on the time when the respective first un-answered message was received in those windows. This time-based rule simulates one scenario in face-to-face conversations where a person responds first to the person who spoke first. Another rule may allow the system to activate chat windows sequentially based on perceived contact priorities. Some contacts, such as the "significant other" or the user's manager, may have higher priority over other contacts. When messages are received in multiple chat windows, the system activates the chat window corresponding to the contact with the highest priority first before activating other windows. This priority-based rule simulates another scenario in face-to-face conversations where a person responds first to the person who he thinks is the most important. Note that the contact priority can be specified by the user or learned by the system over time. For example, if the system observes that the user often promptly responds to messages sent by a particular contact, the system would mark that contact as important. Other variations of rules are possible. In one embodiment, the system may use a mix of time-based and priority-based chat-window-switching rules. For example, when two messages from different chat windows arrive within a short time between each other, the system first switches to the window associated with the higher-priority contact; similarly, when two contacts have the same priority, the system would switch to the chat window with the earlier message. In addition, the system may also assign weights to the priority value and the wait time, and derive the order of switching based on the weighted sum of priority value and the wait time.

In addition to the user-defined rules, the system may adaptively learn window-switching habits of the user and build new chat-window-switching rules based on observed user behavior. Note that the system still allows the user to manually switch between chat windows, and allows the user to make corrections to the automatic switching. Hence, the system can improve the likelihood that the automatic window switching meets the user's needs by continuously learning and building new rules.

Switching-sequence-determination module 210 receives inputs from the window-activity-monitoring modules 202-206 and rule database 208, and determines the switching sequence based on the monitored activities and rules. For example, window-activity-monitoring module 202 observes that a corresponding chat window has remained idle for a predetermined amount of time. Based on such an observation and a time-based rule, switching-sequence-determination module 210 may determine that that particular window should be switched out, either by minimizing it or by sending it to the background.

In a further example, window-activity-monitoring module 202 may observe a message being received in a corresponding chat window at a particular time, and window-activity-monitoring module 204 may observe a message being received in a different chat window at a later time. Based on such observations, as well as the time-based chat-window-switching rule, switching-sequence-determination module 210 may determine that the window that receives a message first (the one monitored by window-activity-monitoring module 202) should be switched to (or brought into focus) first. In addition, once window-activity-monitoring module 202 observes that the user has typed a message in the chat window and that the message has been sent, switching-sequence determination module 210 can then determine that the user is temporarily done with this window, and bring the next chat window in the queue into the forefront. If the user is not responding to the message in the current chat window, the system can switch to the next chat window in the queue after a predetermined wait time, or the user can choose to switch to the next window immediately once he decides not to respond to messages received in a current window.

Now imagine a scenario where a user is simultaneously chatting with five other users, with five chat windows open, each including a message needing to be read and responded to. In a conventional chat system, to respond to a particular individual, the user needs to manually select the corresponding window, read the message in the window, and type in his response. In the meantime, other individuals are still waiting for the user to respond, some of them perhaps having to wait a long time because the user may not be aware of the order in which messages are received in those windows. In embodiments of the present system, the chat windows are brought to focus for the user based on the time order when the messages are received. Once the user finishes viewing a message and/or sending a response in the currently active chat window, the next chat window is automatically brought to the forefront so that the user can view and respond to the received message in that chat window. This way, the other users do not have to wait for a long time for a response from the user unless the user has deliberately chosen to delay responding.

Window-switching module 212 receives input from switching-sequence-determination module 210 and performs the window-switching actions accordingly, which may include, but are not limited to: minimizing a chat window, sending a chat window to the background, opening a new chat window, bringing a chat window to focus or to the forefront, etc. In one embodiment, window-switching module 212 automatically performs the window-switching operation, such as sending the currently active window to the background and bringing a different window to the forefront, without the need for the user to manually make a window selection or performing a switching operation. For example, after a user is temporarily done with a chat window (either by responding to the message within or by ignoring it for a prolonged time period), the system automatically minimizes it or sends it to the background without the user having to perform such actions manually.

Feedback-receiving module 214 receives user feedback to the automatic switching of chat windows. This feedback mechanism allows the user to make corrections in cases where undesired window switching takes place. For example, once the system switches out of a timed-out window, if the user decides that he wants that window to remain in focus, the user can request the system to "un-do" the switching. In one embodiment, before switching out of a timed-out window, the system may request confirmation from the user, and proceed to perform the switching only after the user confirms.

Error prompter 216 receives input from the window-activity monitoring modules 202-206, and prompts the user for possible messaging errors. In one embodiment, based on the chat content within each monitored chat window, error prompter 216 can identify possible messaging errors, such as typing a message into a wrong window, and prompt the user of such errors. For example, a user A is simultaneously chatting with a user B and a user C. User A is discussing a recently seen movie with user B while discussing a cake recipe with user C. While the chat windows for the two conversations are being switched, user A accidentally types something related to cake recipes (which is intended for user C) into the window which contains the movie discussion. Before user A sends such a message to the wrong recipient, error prompter 216 determines, based on the monitored chat content, that the user is likely to have typed in the wrong window, and prompts user A for such an error. In one embodiment, error prompter 216 may be coupled to window-switching module 212 to allow the message typed in the wrong window to be automatically transferred to the intended window. In a further embodiment, a user confirmation is required before such an action takes place.

Figure 3A:
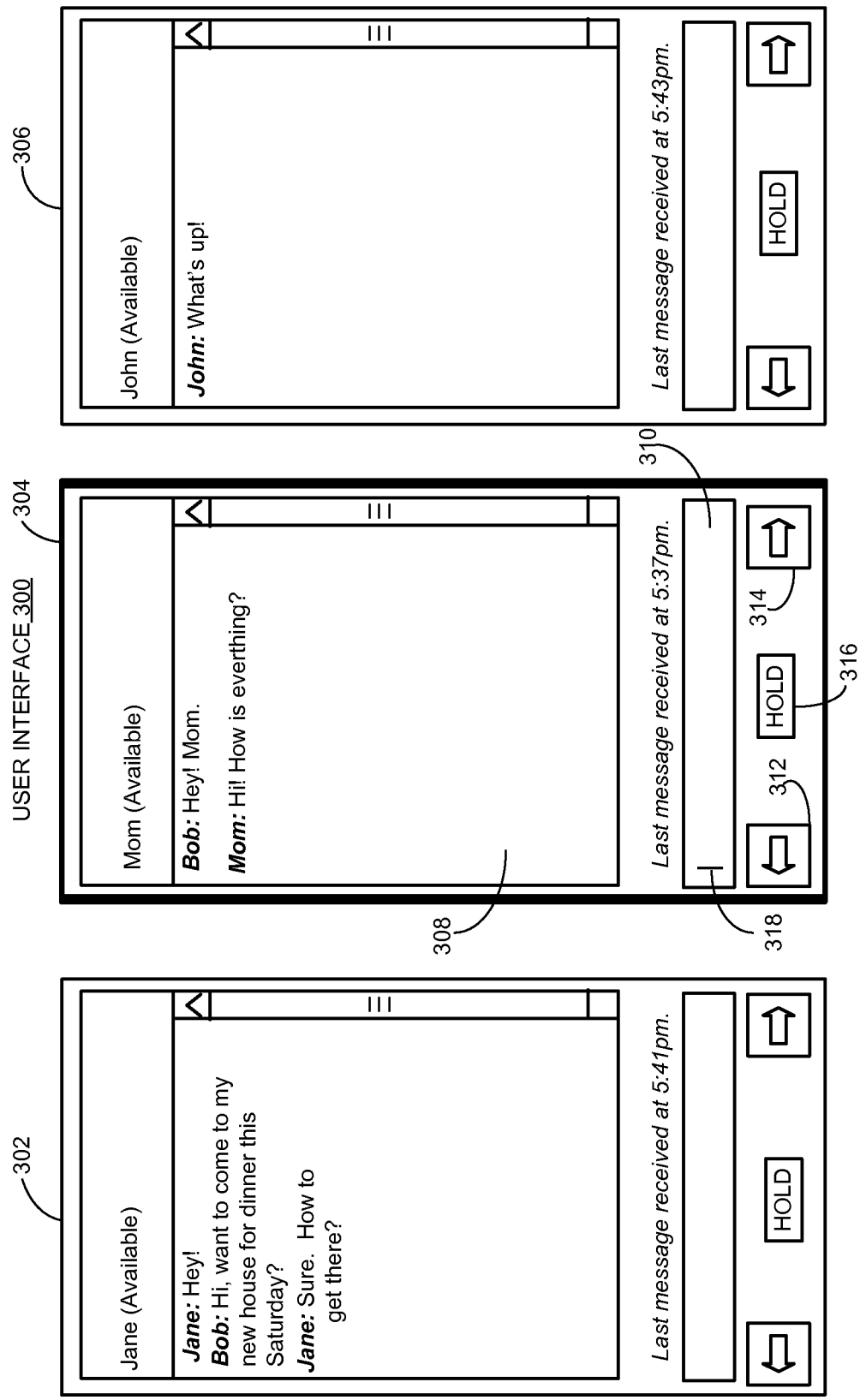
FIG. 3A presents a diagram illustrating an exemplary view of a user interface of a chat client application that enables intelligent automatic switching between chat windows.

FIG. 3A presents a diagram illustrating an exemplary view of a user interface of a chat client application that enables intelligent automatic switching between chat windows. In the example shown in FIG. 3A, user interfaces includes three simultaneously open chat windows 302, 304, and 306. Using these three windows, a user Bob is simultaneously chatting with three other users, Jane, Mom, and John. Each chat window includes a conversation display field, such as field 308; an input field, such as field 310; a backward button, such as button 312; a forward button, such as button 314; and a hold button, such as button 316.

From FIG. 3A, one can see that all three windows include messages that haven't been seen or responded to by the user Bob. The messages are received at different times. More specifically, the message in chat window 304, which corresponds to the contact "Mom," arrives the earliest. According to a time-based switching rule, the system brought chat window 304 to the forefront, as illustrated in FIG. 3A. The highlighted border of chat window 304 indicates that it is the current window of focus, and a blinking cursor 318 in the input field of chat window 304 indicates that any subsequent typing will be input into chat window 304. The forward and backward buttons allow the user Bob to manually change the window-switching outcome. By clicking backward button 312, the user Bob can return to the chat window that was previously in focus. By clicking forward button 314, the user Bob can switch to the next chat window. In the example shown in FIG. 3A, if the switching rule is time-based, the next chat window is window 302. User Bob can also click on hold button 316 to make chat window 304 remain in focus persistently. In addition, the user Bob can perform any manual window switching by clicking on a corresponding window, making that window the currently active window.

Note that if the chat-window-switching rule used by the system is priority-based or a mixture of time- and priority-based, the switching sequence may be different. For example, if the order of priority of the three contacts is: Mom>Jane>John, using a priority-based switching rule, the system would determine a switching sequence as: window 304→window 302→window 306.

Figure 3B:
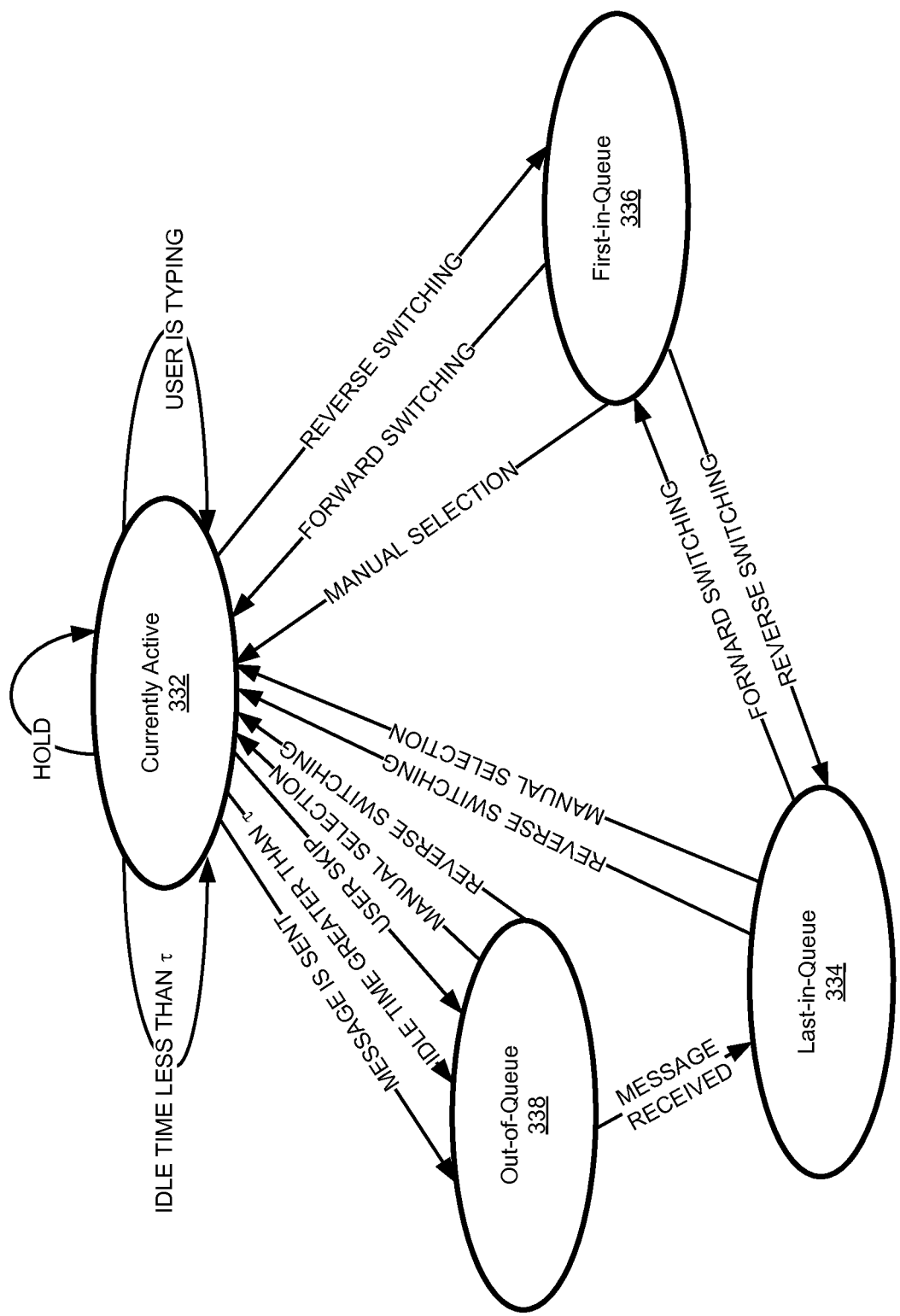
FIG. 3B presents a state diagram illustrating an exemplary state transition for a particular chat window shown in FIG. 3A.

FIG. 3B presents a state diagram illustrating an exemplary state transition for a particular chat window shown in FIG. 3A. In the example shown in FIG. 3B, a chat window has four states: a currently active state 332, a last-in-queue state 334, a first-in-queue state 336, and an out-of-queue state 338.

When the system is in operation, the chat window may start from any of the states. If the chat window is in state 332, it is currently active, or in the forefront. Given that there are unread messages in other chat windows, the chat window will remain in state 332 under three conditions, that is when the user is typing, when the user clicks the "hold" button to make the window persistently active, or when the idle time is less than a predetermined threshold value r Note that the predetermine threshold value r is carefully selected to make sure the user has enough time to read and respond to the received message. In one embodiment, instead of a fixed value, a predetermined function based on the length of the received message is used to calculate the threshold value τ. Also note that these three conditions are conditions for a forward switching action to be performed. When there are no unread messages in other chat windows, the system may keep the current chat window active or may minimize it after the predetermined time threshold. This is not shown in the figure because this disclosure mainly considers scenarios where unread messages are waiting in other chat windows.

The transition from the "currently active" state 332 to the "out-of-queue" state 338 occurs when one of three actions are performed. The actions include: a message being sent, the idle time exceeding the predetermined threshold value r, and the user skipping this chat window (by clicking the forward button). If these actions are performed, meaning that the user is temporarily down or ignoring this chat winnow, the system places this window into the "out-of-queue" state 338. Note that the queue includes windows with messages waiting. The transition from the "currently active" state 332 to the "first-in-queue" state 336 occurs when a reverse switching (when the user clicks the backward button) is performed.

Once the chat window is in the "out-of-queue" state 338, it can transit back to the "currently active" state 332 by the user manually selecting the window or when a reverse switching action is preformed (by the user clicking the backward button). A chat window in the "out-of-queue" state 338 can transit to the "last-in-queue" state 334 when a message is received in the chat window.

Once the chat window is in the "last-in-queue" state 334, it can transit to "first-in-queue" state 336 whenever a forward switching action takes place. The forward switching may be an automatic system switching or caused by the user skipping a current window. In addition, the chat window in "last-in-queue" state 334 can transit to "currently active" state 332 when the user manually selects that window or when a reverse switching action is performed.

Once the chat window is in the "first-in-queue" state 336, it can transit to the "currently active" state 332 whenever a forward switching action takes place or when the user manually selects that window. In addition, the chat window in the "first-in-queue" state 336 can transit to the "last-in-queue" state 334 when a reverse switching action is performed.

Note that in the example shown in FIGS. 3A and 3B, there are three chat windows open. If the number of chat window open in the system is different than three, the number of states will change accordingly. The transitions between the intermediate states (the ones in the middle of the queue) are similar to the transitions between the "last-in-queue" state 334 and the "first-in-queue" state 336. In addition, each and every state can directly transit to the "currently active" state 332 under the user's manual selection. Also note that if there are multiple chat windows in the "out-of-queue" state 338, they may be placed in a separate queue based on the time they were switched out. A reverse switching action only brings the window in the front of the queue back to the "currently active" state 332.

Figure 4:
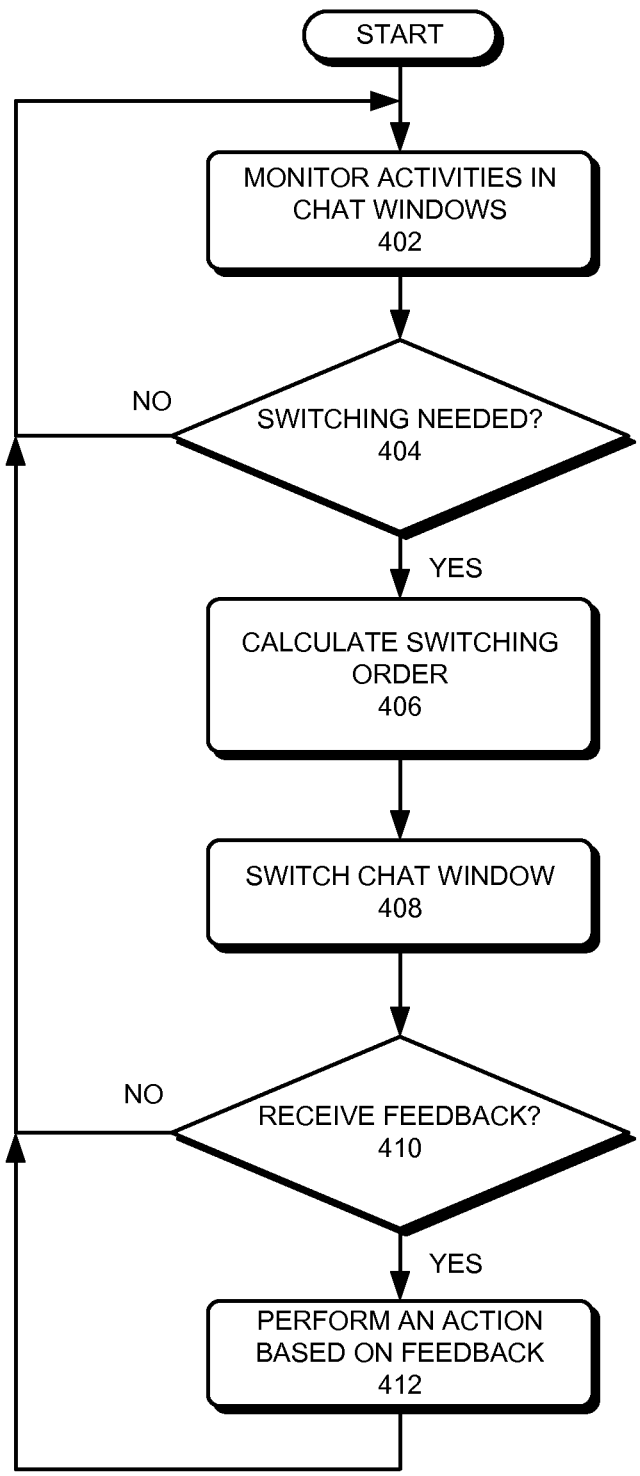
FIG. 4 presents a flowchart illustrating an exemplary operation process of the chat system that enables intelligent automatic switching between chat windows.

FIG. 4 presents a flowchart illustrating an exemplary operation process of the chat system that enables intelligent automatic switching between chat windows. During operation, the system monitors activities occurring within the chat windows (operation 402), and determines if the currently active chat window (or the window in focus) needs to be switched out (operation 404). For example, the system may notice that there are unread messages in other chat windows and that the currently active window has remained idle for a predetermined time, or the system may notice that there are unread messages in other chat windows and that a message is sent in the currently active window; in these cases, the system may determine that the currently active window should be switched out. If the system determines that the currently active window needs to be switched out, the system calculates a window-switching order based on one or more user-defined criteria and the monitored activities (operation 406). In one embodiment, the system determines which chat window to be switched to. If the system determines that no switching is needed, the system continues monitoring. Subsequently, the system performs the chat-window-switching operation without the need for the user to manually perform the switching operation (operation 408), and determines if a user feedback is received (operation 410). If no user feedback is received, the system resumes monitoring window activities (operation 402). Otherwise, the system performs an action, such as switching the windows forward or backward, based on the user's feedback (operation 412), and continues to monitor window activities.

Figure 5:
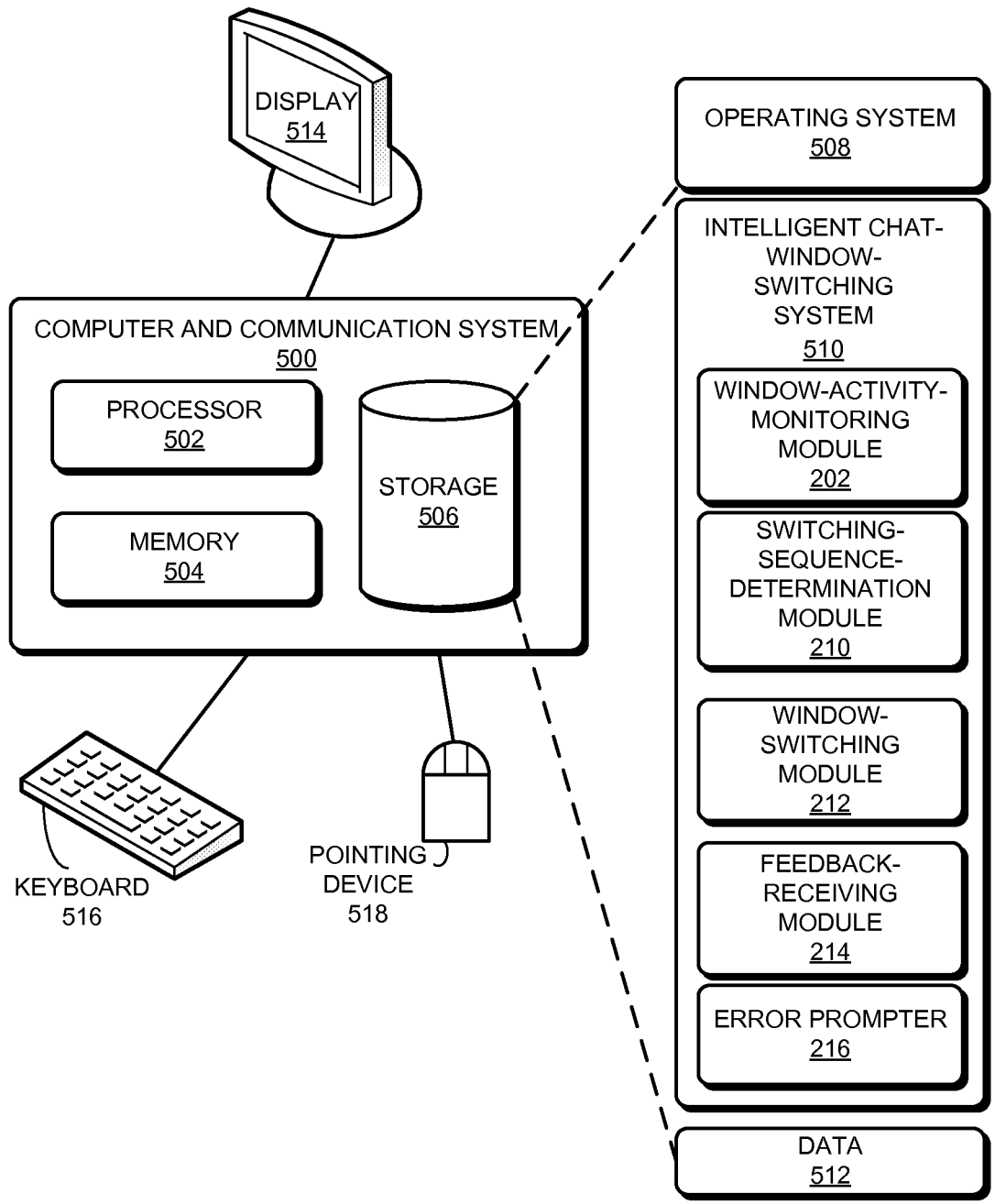
FIG. 5 illustrates an exemplary computer system for intelligent automatic switching of chat windows.

FIG. 5 illustrates an exemplary computer system for intelligent automatic switching of chat windows. In one embodiment, a computer and communication system 500 includes a processor 502, a memory 504, and a storage device 506. Memory 504 can include a volatile memory (e.g., RAM) that serves as a managed memory, and can be used to store one or more memory pools. Furthermore, computer system 500 can be coupled to a display device 514, a keyboard 516, and a pointing device 518. Storage device 506 can store an operating system 508, an intelligent chat-window-switching system 510, and data 512.

Intelligent chat-window-switching system 510 can include instructions, which when executed by computer system 500 can cause computer system 500 to perform methods and/or processes described in this disclosure. Specifically, intelligent chat-window-switching system 510 may include instructions for monitoring window activities (window-activity-monitoring module 202). Further, intelligent chat-window-switching system 510 can include instructions for determining a switching sequence (switching-sequence-determination module 210) and instructions for switching chat windows (window-switching module 212). Intelligent chat-window-switching system 510 can also include instructions for receiving user feedback (feedback-receiving module 214) and instructions for prompting user possible message errors (error prompter 216).

Data 512 can include any data that is required as input or that is generated as output by the methods and/or processes described in this disclosure. Specifically, data 512 can store user-definable chat-window-switching rules. In addition, data 512 can store "conversations" among chat participants and any data, including time, frequency, and sequence, associated with the window-switching activities.

Note that, although this disclosure uses an instant messaging system as an example, the scope of the present invention is not limited to the instant messaging system. Other online chat systems may be used including, but not limited to: online chat rooms, web conferring, private messaging systems used in social networking websites, etc. In addition to being a standalone system, the intelligent chat-window-switching system can also be part of other personal or collaborative data managing systems. In one embodiment, the intelligent chat system is part of Zimbra® (registered trademark of VMware Inc. of Palo Alto, Calif.) Collaboration Suite.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for intelligent automatic switching between multiple chat windows in an online chat application, comprising:
   monitoring, by a computer, activities occurring within the multiple chat windows wherein each of the multiple chat windows are distinct;
   determining whether a window-switching operation is needed based on the monitored activities including determining the window-switching operation is needed based on an elapsed time since activity has respectively occurred within each of the multiple chat windows; and
   in response to determining that the window-switching operation is needed, performing the window-switching operation from a first window without the need for a user of the chat application to perform the window-switching operation manually;
   wherein performing the window-switching operation comprises:
      determining a switching sequence for two or more windows of the multiple chat windows, the switching sequence defining a queue having an ordering for separately and sequentially bringing a plurality of the two or more windows into focus; and
      switching focus to a next window in the queue; and
   wherein determining the switching sequence comprises:
      determining an order for switching between the first window and the two or more windows in sequence including switching focus from the first window to a second window based on a first determining that the window-switching operation is needed and a subsequent switching of focus from the second window to a third window in the sequence based on a second determining that the window-switching operation is needed, wherein the order for switching between the first window and the two or more windows in sequence is calculated based on the monitored activities and a plurality of user defined switching rules, wherein the user defined switching rules include both time-based rules and priority-based rules; and
      placing each of the multiple chat windows in the queue according to the calculated order.

2. The method of claim 1, wherein the activities include at least one of:
   a message being received;
   a message being typed; and
   a message being sent.

3. The method of claim 1, further comprising identifying a chat window associated with the window-switching operation, wherein the window-switching operation comprises activating the identified chat window.

4. The method of claim 3, wherein identifying the chat window comprises determining priority levels of contacts associated with the chat windows.

5. The method of claim 3, wherein identifying the chat window involves determining a time when a message is received in the chat window.

6. The method of claim 1, wherein determining whether a window-switching operation is needed involves determining whether an idle time associated with a currently active window exceeds a predetermined value.

7. The method of claim 1, further comprising receiving feedback from the user for the automatically performed switching operation.

8. The method of claim 1, further comprising:
   monitoring chat content within the chat windows;
   determining whether a message is typed into a wrong chat window based on the monitored chat content; and
   notifying the user in response to determining that the message is typed into the wrong chat window.

9. The method of claim 1, further comprising:
   receiving user input manually switching between the multiple windows in a forward or a reverse direction according to the calculated order.

10. A non-transitory computer-readable storage medium storing instructions that when executed by a computer cause the computer to perform a method for intelligent automatic switching between multiple chat windows in an online chat application, the method comprising:
   monitoring activities occurring within the multiple chat windows wherein each of the multiple chat windows are distinct;

determining whether a window-switching operation is needed based on the monitored activities including determining the window-switching operation is needed based on an elapsed time since activity has respectively occurred within each of the multiple chat windows; and in response to determining that the window-switching operation is needed, performing the window-switching operation from a first window without the need for a user of the chat application to perform the window-switching operation manually;

wherein performing the window-switching operation comprises:

determining a switching sequence for two or more windows of the multiple chat windows, the switching sequence defining a queue having an ordering for separately and sequentially bringing a plurality of the two or more windows into focus; and switching focus to a next window in the queue; and wherein determining the switching sequence comprises:

determining an order for switching between the first window and the two or more windows in sequence including switching focus from the first window to a second window based on a first determining that the window-switching operation is needed and a subsequent switching of focus from the second window to a third window in the sequence based on a second determining that the window-switching operation is needed, wherein the order for switching between the first window and the two or more windows in sequence is calculated based on the monitored activities and a plurality of user defined switching rules, wherein the user defined switching rules include both time-based rules and priority-based rules; and placing each of the multiple chat windows in the queue according to the calculated order.

11. The storage medium of claim 10, wherein the activities include at least one of:
a message being received;
a message being typed; and
a message being sent.

12. The storage medium of claim 10, wherein the message further comprises identifying a chat window associated with the window-switching operation, wherein the window-switching operation comprises activating the identified chat window.

13. The storage medium of claim 12, wherein identifying the chat window involves determining priority levels of contacts associated with the chat windows.

14. The storage medium of claim 12, wherein identifying the chat window involves determining a time when a message is received in the chat window.

15. The storage medium of claim 10, wherein determining whether a window-switching operation is needed involves determining whether an idle time associated with a currently active window exceeds a predetermined value.

16. The storage medium of claim 10, wherein the method further comprises receiving feedback from the user for the automatically performed switching operation.

17. The storage medium of claim 10, wherein the method further comprises:
monitoring chat content within the chat windows;
determining whether a message is typed into a wrong chat window based on the monitored chat content; and
notifying the user in response to determining that the message is typed into the wrong chat window.

18. A computer system for intelligent automatic switching between multiple chat windows in an online chat application, comprising:

one or more computers each comprising a processor and a memory coupled to the processor, wherein the one or more computers are operable to perform operations comprising:

monitoring activities occurring within the multiple chat windows wherein each of the multiple chat windows are distinct;

determining whether a window-switching operation is needed based on the monitored activities including determining the window-switching operation is needed based on an elapsed time since activity has respectively occurred within each of the multiple chat windows; and in response to determining that the window-switching operation is needed, perform the window-switching operation from a first window without the need for a user of the chat application to perform the window-switching operation manually;

wherein performing the window-switching operation comprises:

determining a switching sequence for two or more windows of the multiple chat windows, the switching sequence defining a queue having an ordering for separately and sequentially bringing a plurality of the two or more windows into focus; and switching focus to a next window in the queue; and wherein determining the switching sequence comprises:

determining an order for switching between the first window and the two or more windows in sequence including switching focus from the first window to a second window based on a first determining that the window-switching operation is needed and a subsequent switching of focus from the second window to a third window in the sequence based on a second determining that the window-switching operation is needed, wherein the order for switching between the first window and the two or more windows in sequence is calculated based on the monitored activities and a plurality of user defined switching rules, wherein the user defined switching rules include both time-based rules and priority-based rules; and placing each of the multiple chat windows in the queue according to the calculated order.

19. The computer system of claim 18, wherein the activities include at least one of:
a message being received;
a message being typed; and
a message being sent.

20. The computer system of claim 18, further operable to perform operations comprising identifying a chat window associated with the window-switching operation, and wherein the window-switching operation comprises activating the identified chat window.

21. The computer system of claim 20, wherein identifying the chat window comprises determining priority levels of contacts associated with the chat windows.

22. The computer system of claim 20, wherein identifying the chat window, includes determining a time when a message is received in the chat window.

23. The computer system of claim 18, wherein determining whether a window-switching operation is needed includes determining whether an idle time associated with a currently active window exceeds a predetermined value.

24. The computer system of claim 18, wherein the one or more computers are further operable to receive feedback from the user for the automatically performed switching operation.

25. The computer system of claim 18, wherein the one or more computers are further operable to perform operations comprising:
- monitoring chat content within the chat windows;
- detecting an error by determining that a message is typed into a wrong chat window based on the monitored chat content; and
- notifying the user of the detected error.

* * * * *